United States Patent [19]

Stanfield et al.

[11] 3,959,048

[45] May 25, 1976

[54] APPARATUS AND METHOD FOR REPAIRING ELONGATED FLEXIBLE STRIPS HAVING DAMAGED SPROCKET FEED HOLES ALONG THE EDGE THEREOF

[76] Inventors: James S. Stanfield, 900 Euclid, Santa Monica, Calif. 90403; Paul W. Trester, 2312 9th St., Olivenhain, Calif. 92024

[22] Filed: Nov. 29, 1974

[21] Appl. No.: 528,028

[52] U.S. Cl. .................................. 156/94; 156/199; 156/302; 156/552; 242/58.1; 242/58.5; 264/36; 425/11

[51] Int. Cl.$^2$ .......................................... B32B 35/00

[58] Field of Search ............ 242/58.1, 58.5; 156/94, 156/157, 199, 299, 543, 552, 302; 264/36; 425/11

[56] References Cited

UNITED STATES PATENTS

| | | | |
|---|---|---|---|
| 2,565,009 | 8/1951 | Wallingsford | 242/58.1 |
| 2,900,868 | 8/1959 | Gaffner | 156/157 |
| 3,546,046 | 12/1970 | MacQueston | 156/157 |

*Primary Examiner*—Edward G. Whitby
*Attorney, Agent, or Firm*—Fulwider Patton Rieber Lee & Utecht

[57] ABSTRACT

Disclosed is an apparatus and method for automatically aligning and bonding a preperforated flexible repair tape to the side edge portion of an elongated strip, such as motion picture film, having damaged sprocket feed hole perforations located therealong. Film to be repaired is fed continuously from a supply reel through a pair of straightening and flattening rollers to a repair station comprising a pressure roller cooperating with a sprocket roller to automatically and precisely align the preformed feed holes of the tape with the damaged feed hole locations of the film and to bond the tape and film together in the aligned condition. From the repair station, the laminated tape and film pass through a pair of cooperating rollers to more firmly bond the tape and film preparatory to collection on a take-up reel.

25 Claims, 9 Drawing Figures

APPARATUS AND METHOD FOR REPAIRING ELONGATED FLEXIBLE STRIPS HAVING DAMAGED SPROCKET FEED HOLES ALONG THE EDGE THEREOF

BACKGROUND OF THE INVENTION

This invention relates to repair of elongated, flexible perforated strips such as tape, film and the like, and more specifically, relates to a method and apparatus for repairing damaged sprocket feed hole perforations located along the edges of such strips, particularly motion picture film strips.

Motion picture film strips, as well as numerous other types of elongated, flexible perforated strips, include rows of perforations called sprocket feed holes along one or both edges of the strips and which are engaged by the teeth of a shuttle arm or sprocket wheel of automated equipment such as projectors to drive the strips through the equipment during use. It is not uncommon for the driving teeth to tear and damage the strip in the area of the sprocket feed holes, this being particularly true in the case of commercial film strips which may be shown many times a day over long periods, and in the case of educational films which frequently are shown by inexperienced projectionists in schools and the like.

Often, the sprocket feed hole damage will become so severe that the film cannot be used, and the damaged sections of film must be either cut out or repaired in some other manner. With relatively short sections of damage, it has heretofore been the practice to simply cut out the damaged frames and splice the remaining butt sections back together using a short length of commercially available adhesive repair tape such as disclosed in U.S. Pat. No. 3,434,898. when the damage extends over many feet of film, however, it is not practical to simply cut out the damaged footage, and typically the film must be either discarded or replacement footage obtained and substituted for the damaged film portions.

While attempts have heretofore been made at repairing elongated sections of damaged film by laminating repair tape over the damaged film footage, such attempts have not proved acceptable for several reasons. For one thing, motion picture film generally shrinks when it is developed and also with age and with changes in atmospheric conditions, and the prepunched sprocket feed holes in commercially available repair tape which normally are dimensioned to correspond with new film prior to developing, will quickly become longitudinally disaligned with the original film sprocket feed holes when applied to developed and old film. Another problem has been that in applying repair tape, each sprocket feed hole of the tape must be very accurately aligned in the direction of the width of the film with the corresponding sprocket feed hole location on the damaged film. If not accurately aligned, the repaired film may not move smoothly through a projector and may misregister in the projection gate during projection thereby causing blurred and distorted image projection.

Still a further problem with prior attempts to repair damaged film footage with conventional repair tape has been that the tape covers not only the edge portion of the film containing the sprocket feed holes, but also the entire picture frame. In covering the picture frame, the tape hinders light transmission through the frame and picture definition and clarity may be appreciably and noticably reduced. Moreover, with such a laminated composite, the film becomes less flexible and the increased stiffness can frequently cause disalignment of the film from the drive mechanism of a projector.

SUMMARY OF THE INVENTION

The present invention provides a method and apparatus for automatically applying any selected length of elongated flexible repair tape to the damaged side edge portion of an elongated flexible strip in a manner which insures that the replacement sprocket feed hole perforations of the tape are precisely aligned within acceptable tolerances with the locations of the original damaged sprocket feed hole perforations of the strip. Moreover, with the present invention the repair tape is applied to the strip in a simple, reliable, and effective manner, and permits very long lengths of a damaged strip to be quickly and easily repaired, no matter how much the strip has strunk nor how badly the side edge portion has been damaged.

More specifically, in accordance with the invention, the apparatus includes a primary repair station having means for initially aligning the repair tape with the side edge portion of the strip to be repaired, and for precisely aligning an initial feed hole perforation in the tape with an initial feed hole perforation in the film so that the two perforations substantially coincide to within acceptable and critical tolerances. Once the initial tape and film alignment has been achieved, the tape is bonded to the film in the aligned condition and thereafter, both the tape and strip are continuously fed through this repair station and automatically aligned and bonded together with each sprocket feed hole in the tape being sequentially laminated to the edge portion of the strip until the entire length of the strip to be repaired has been laminated with tape.

To effect accurate alignment of the holes in the tape with the hole locations in the strip during movement through the primary repair station, the tape and strip pass over a sprocket roller where each sprocket feed hole in the strip is sequentially positioned together with a sprocket feed hole on the tape over a sprocket tooth. The sprocket teeth are spaced apart around the roller a distance substantially equal to the spacing between holes in the tape, and each tooth has a cross-sectional shape similar to that of the holes to substantially fill, in major part, the space within the holes.

Each sprocket tooth is dimensioned to have a base perimeter within the acceptable tolerance limits of disalignment between the lengthwise and lateral edges of the holes of the tape and strip, and acts to position and hold the tape and strip in alignment during bonding. Cooperating with the sprocket roller is a pressure roller having apertures therein for receiving the teeth of the sprocket roller and together with the sprocket roller, the pressure roller functions to automatically feed the tape and strip through the repair station so that each sprocket feed hole is sequentially positioned over a tooth and the tape is laminated and bonded to the strip.

The repair apparatus of the invention also provides a preliminary station comprising a pair of pressure rollers, one of which is heated, for initially flattening and straightening the strip to be repaired preparatory to lamination with the repair tape in the primary repair station. A terminal station, similar to the preliminary station, is also provided and through which the laminated repaired strip passes to more firmly bond the strip and tape and to smooth out any creases or gathers formed in the tape during lamination in the primary repair station.

Many additional features and advantages of the present invention will become more apparent from the following detailed description taken in conjunction with the accompanying drawings which disclose, by way of example, the principles of the invention.

DETAILED DESCRIPTION

As shown in the exemplary drawings, the present invention is embodied in an apparatus 20 and method for repairing substantial lengths of elongated, flexible strips having a relatively large number of sprocket feed hole perforations along one or both side edge portions which have been damaged during handling or use. In this instance, the method and apparatus 20 are illustrated in connection with the repair of a motion picture film strip 22 having sprocket feed holes 24 along only one side edge portion and which have been torn and damaged during use, typically during projection.

Quite often during use, as film is indexed through the projection gate of a projector, disalignment of the sprocket feed hole perforations in the film with the shuttle arm teeth or sprocket wheel teeth of the projector film drive will occur. When this happens, it is not uncommon for long lengths of the side edge portion of the film carrying the sprocket feed holes to be torn and damaged by the shuttle or sprocket teeth. In some instances, the damage can be so great as to prevent subsequent projection of the film, and frequently when film which has been damaged is again projected, the damaged portions may cause the image bearing frames to misregister in the projection gate thereby causing distorted and blurred images to be projected and often causing further film damage.

Figure 2:
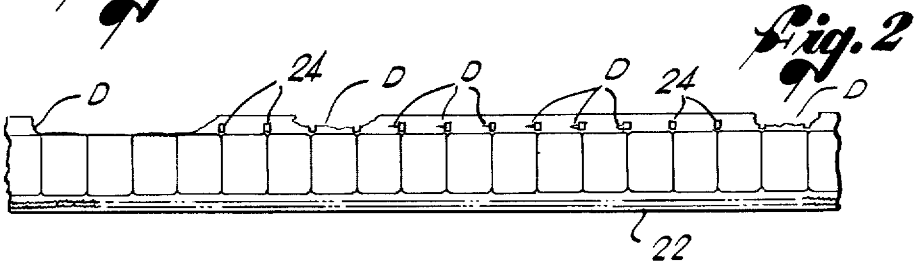
FIG. 2 is an enlarged fragmentary plan view of a portion of a motion picture film strip exhibiting damage of the type repairable by the present invention.

Illustrated in FIG. 2 are several types of sprocket feed hole damage, herein designated by the reference character "D," frequently found in motion picture film, and which may prevent subsequent projection and smooth operation of the film through a projector. With the present invention, damage of the type illustrated in FIG. 2, as well as other types of damage such as cracking and chipping occurring in the sprocket feed hole areas of an elongated, flexible strip, can be readily repaired even though the damage extends many feet in length.

Figure 1:
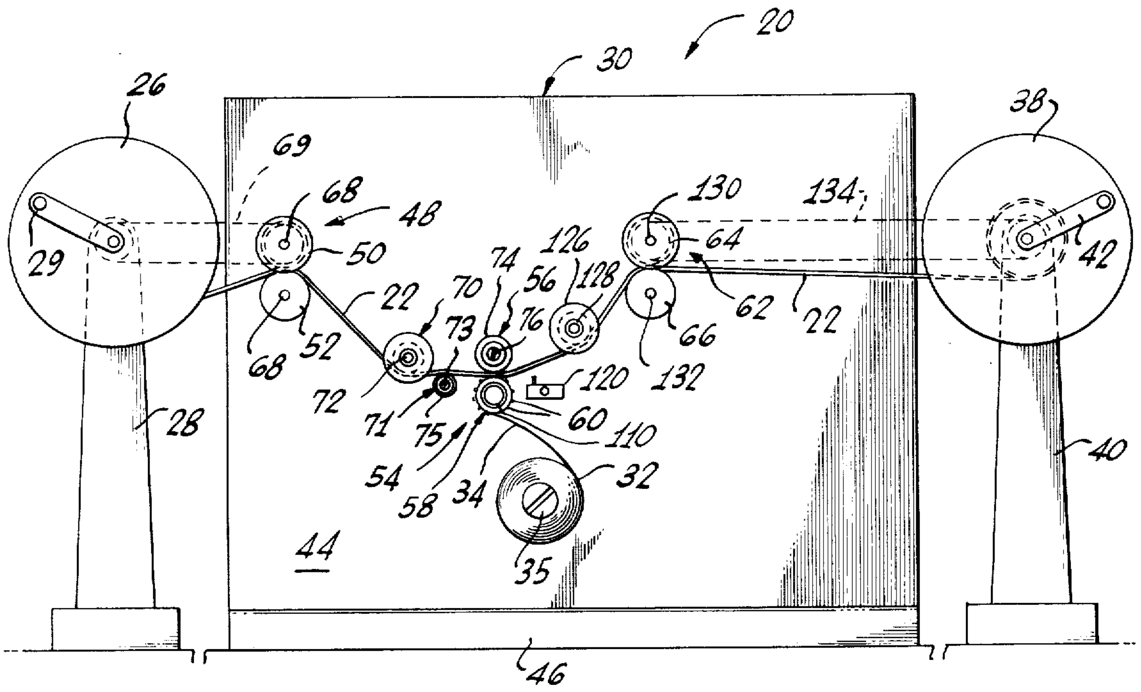
FIG. 1 is a front elevational view of an apparatus embodying the principles of the present invention and shown in connection with the repair of a damaged motion picture film strip.

With reference primarily to FIG. 1, the film 22 containing portions with damaged sprocket feed hole perforations is carried on a supply reel 26, located on the left in FIG. 1, which is rotably supported by a stand 28 of conventional design, and which can be driven by a hand crank 29. Film from the supply reel 26 is supplied to a repair apparatus 30 which carries a supply roll 32 of preperforated transparent film repair tape 34 to be applied to the film 22 for replacing the damaged sprocket feed holes in the film. Herein, the supply roll 32 of repair tape 34, which can be such as that made by E. I. du Pont De Nemours and Co. and sold under the trademark "Mylar" and having a pressure sensitive adhesive on one side, is rotatably supported on a shaft 35 attached to the apparatus 30, and has been initially cut and modified so that only the side edge portion of the tape carrying preformed replacement sprocket feed hole perforations 36 (see FIG. 4.) remains, the reason for which will become more apparent hereinafter.

Film 22 to be repaired from the supply reel 26 is directed through the repair apparatus 30 where the repair tape 34 is bonded to the damaged edge portions of the film, and after repair, the film is directed from the repair apparatus and collected on a take-up reel 38. Herein, the take-up reel 38 is mounted on a conventional stand 40 located at the right in FIG. 1, and can be rotated in any suitable manner, for example, by a hand crank 42 to wind the repaired film onto the reel.

In accordance with the invention, the repair apparatus 30 automatically applies any selected length of repair tape 34 to the side edge portion of the film 22 and does so in a manner which insures that the replacement sprocket feed holes 36 of the tape are precisely aligned within acceptable tolerances with the location of the original sprocket feed holes 24 of the damaged film so that each hole of the tape substantially coincides with the corresponding hole location of the film. Moreover, the repair apparatus 30 applies the repair tape 34 to the film 22 in a simple, reliable, and effective manner, and permits very long lengths of damaged film footage to be quickly and easily repaired no matter how much the film has shrunk due to developing, age, or the like, nor how badly the side edge portion of the film carrying the sprocket feed holes 24 has been damaged.

Toward the foregoing ends, the repair apparatus 30 includes a support frame 44 which herein comprises a generally rectangular metal plate upstanding from a supporting platform 46, and which carries a preliminary station 48 comprising a pair of pressure rolls 50 and 52, one of which is heated, to initially flatten and straighten the damaged film 22 from the supply reel 26, a primary repair station 54 comprising a pressure roller 56 cooperating with a sprocket roller 58 provided with upstanding peripheral sprocket teeth 60 adjacent one end and which function to precisely align the sprocket feed holes 36 in the repair tape 34 with the film 22 and to bond the tape 34 and film 22 together, and a terminal station 62 comprising a pair of pressure rollers 64 and 66, one of which is heated, to more firmly bond the repair tape and film together and flatten any creases or gathers in the repair tape.

More specifically, as shown in FIG. 1, film 22 from the supply reel 26, is directed through the nip of the pressure rollers 50 and 52 which applies heat and pressure to the film. The pressure rollers 50 and 52 are mounted on spindles 68 journaled to the frame 44, and are driven by a suitable means herein a chain 69 shown in broken lines in FIG. 1 in synchronism with the supply reel 26 so that as film 22 is withdrawn from the supply reel it will be automatically fed through the preliminary station 48.

Herein, the lower roller 50 is heated by an internal electrical resistance type unit of conventional design (not shown) which heats the roller to a temperature sufficient to soften the film without damaging the picture containing frames. As the film 22 moves through the nip of the pressure rollers 50 and 52 of the preliminary station 48, any kinks, folds, or creases in the film are smoothed out, thereby straightening and flattening the film preparatory to the application of the repair tape 34 at the primary repair station 54.

From the preliminary station 48, the film 22 is directed around a free wheeling flanged guide spool 70 journaled on a shaft 72 secured to the front face of the frame 44, and over a second guide spool 71 journaled on a shaft 73 attached to the frame and which functions to align the film 22 with the pressure and sprocket rollers 56 and 58, respectively, as the film enters the primary repair station 54. The second spool 71 has side flanges 75 which are spaced apart a distance substantially equal to the width of the film 22 and the spool is positioned to direct the film into the nip of the pressure and sprocket rollers 56 and 58 so that the film is not skewed with respect the rollers in that the longitudinal centerline of the film extends in a direction perpendicular to the axes of the pressure and sprocket rollers.

Figure 4:
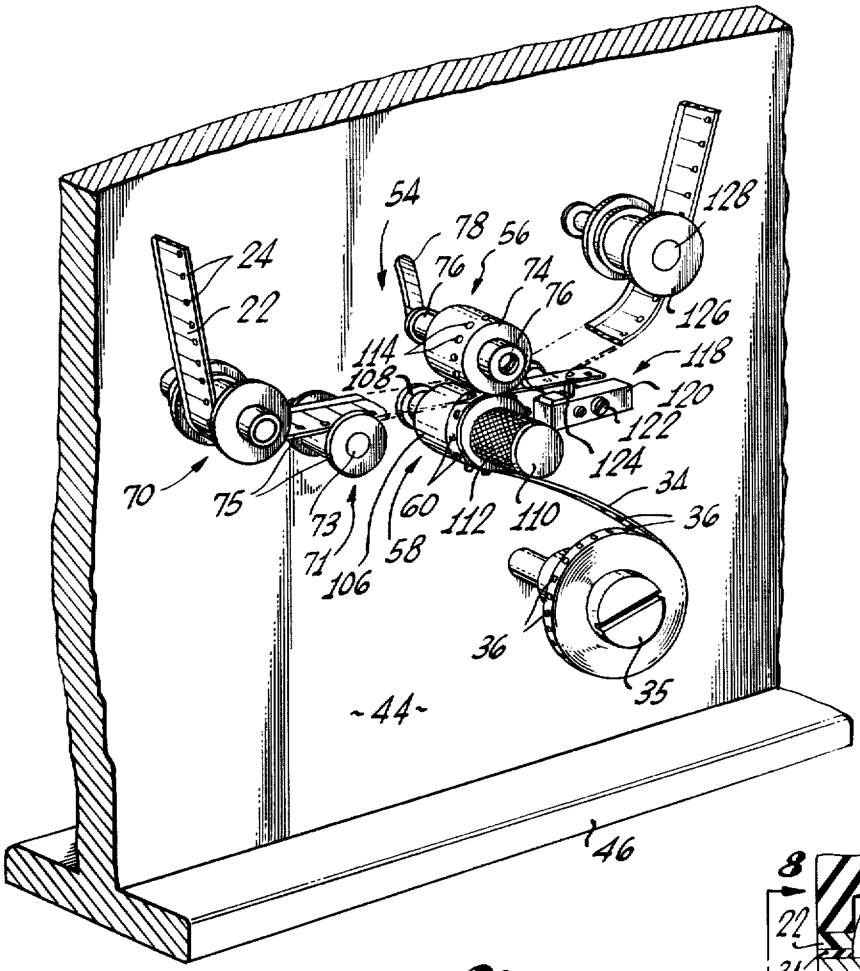
FIG. 4 is an enlarged fragmentary perspective view of a central portion of the apparatus of FIG. 1.
Figure 7:
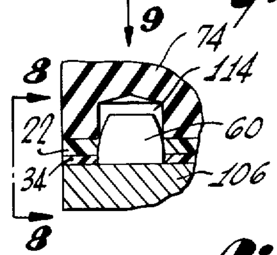
FIG. 7 is a further enlarged fragmentary sectional view taken substantially along line 7—7 of FIG. 6.
Figure 5:
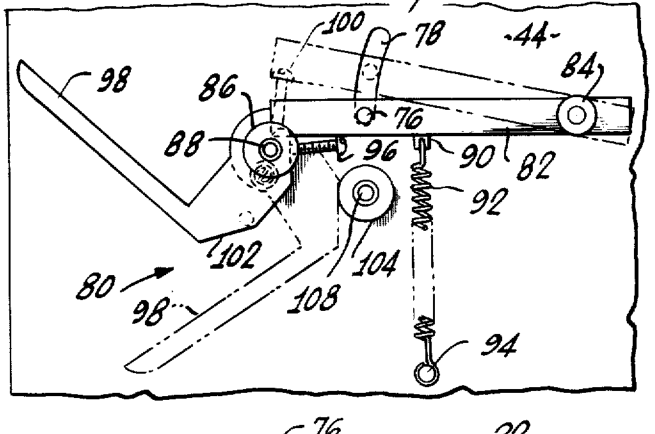
FIG. 5 is a fragmentary rear elevational view of the reverse side of the apparatus portion of FIG. 4.
Figure 8:
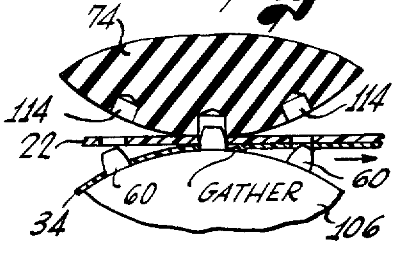
FIG. 8 is a fragmentary sectional view taken substantially along line 8—8 of FIG. 7.

As can best be seen in FIGS. 4 and 5, the pressure roller 56 of the primary repair station 54 herein comprises a smooth surfaced, resilient cylindrical sleeve 74 supported for free rotation on a headed shaft 76 projecting outwardly through an accurate slot 78 in the frame 44. For permitting insertion and removal of the tape 34 and film 22, the pressure roller 56 can be moved upwardly and out of engagement with the sprocket roller 58 by a lever assembly 80, best seen in FIG. 5, mounted on the rear face of the frame 44.

In this instance, the lever assembly 80 comprises an elongated bar 82 of generally rectangular cross-section pivotally connected adjacent one end by a pin 84 to the frame 44, and freely supported at its opposite end on the periphery of a cylindrical ring 86 rotatably mounted on a pin 88 projecting outwardly from the rear face of the frame. Attached to the bar 82 between its ends and projecting downwardly in FIG. 5 is an eyelet 90 to which one end of a spring 92 is connected. The opposite end of the spring 92 is attached to a post 94 on the frame 44 below the bar 82, and serves to bias the bar downwardly in FIG. 5 for maintaining pressure contact between the pressure roller 56 and the sprocket roller 58.

The shaft 76 carrying the pressure roller 56 is secured to the bar 82 intermediate its ends to project forwardly through the accurate slot 78 in the frame 44, and can be raised along the slot by an upstanding cam projection 96, herein a screw, secured to the rotatable ring 86. To rotate the ring 85 and raise the pressure roller 56, a lever arm 98 is secured to the ring, and when the lever arm is rotated counterclockwise from the full line to the phantom line positions of FIG. 5, the ring 86 will rotate the projection 96 and deflect the free end of the bar 82 upwardly, against the bias of the spring 92, about its pivotal connection 84, thereby raising the shaft 76 through the slot 78 and moving the pressure roller 56 away from the sprocket roller 58.

When fully raised, the projection 96 will hold the bar 82, and hence the pressure roller 56, in the raised position against the spring 92 for insertion or withdrawal of the film 22 into or out of the second repair station 54. Herein, the bar 82 has a detent recess 100 adjacent its free end and into which the end of the projection 96 fits to hold the bar in the raised position, over travel beyond the fully raised position of the bar being prevented by a stop abutment surface 102 on the lever arm 98 which engages an abutment projection 104, herein the enlarged end of a shaft 108 which supports the sprocket roller 58 and which is upstanding from the rear face of the frame 44.

The resilient sleeve 74 of the pressure roller 56, herein formed of rubber, cooperates with the sprocket roller 58 to accurately align the sprocket feed holes 36 in the repair tape 34 with the sprocket feed hole locations of the damaged film and to laminate and bond the two together in the aligned condition. Unless the sprocket feed holes 36 in the repair tape 34 are precisely aligned within critical tolerances with the original sprocket feed holes 24 in the film 22, the repaired film will not feed smoothly through a projector and will quite likely cause misregistration of the film frames in the projection gate during projection and frequently complete disengagement from the driving mechanism, often resulting in further film damage.

Commercially available pre-perforated repair tape, typically used heretofore for making butt splices between two terminal ends of film strips, is normally provided with sprocket feed hole perforations which meet the standards for such perforations in new, undeveloped motion picture film strips. The standards for such perforations are well know and published by the American National Standards Institute (ANSI).

As set by ANSI, the standards for 16 mm film, often used for educational films, include generally rectangular shaped sprocket feed holes which are spaced apart a distance 0.300 inches (0.762 cm) from the center of one perforation to the center of the next along the edge of the film, with each hole having a height in the lengthwise direction of the film of 0.050 inches (0.127 cm), and a width in the lateral direction of the film of 0.072 inches (0.183 cm). 35 mm film used for commercial films include standards set by ANSI of 0.187 inches (0.475 cm) between sprocket feed hole perforations from center to center along the edge of the film, 0.110 and 0.078 inches (0.279 and 0.198 cm), depending upon the type of film, for the sprocket feed hole width, and 0.073 and 0.078 inches (0.185 cm and 0.198 cm) for the height of the sprocket feed holes, again depending upon the type of film. In the case of 16 mm films, the sprocket feed holes are perforated 0.0355 inches (0.090 cm) laterally inwardly from the side edge of the film, and in 35 mm films, the sprocket feed holes are perforated either 0.079 or 0.086 inches (0.201 or 0.218 cm) inwardly from the film edge, depending upon the type of film.

It has long been recognized that considerable film shrinkage occurs as a result of processing, storing and use of motion picture film and this has been one of the major problems that has long plagued the motion picture film repair art. Typically, film will shrink as its age increases, and quite often shrinkage will occur during the initial developing process as well. Further, atmospheric conditions such as humidity and temperature may cause dimensional changes in the film size.

As a result of changes in film size, which can in some instances be quite great, the size and spacing of the sprocket feed hole perforations in the film also change. Thus, the standards set by ANSI only apply to tape or film immediately after cutting and perforating, and when repair tape, which typically does not shrink appreciably with age, is applied to developed and old film, the size of and the spacing between the sprocket feed holes of the tape may be considerably greater than that of the film thereby rendering alignment of the sprocket feed holes of the tape with that of the film extremely different, especially when very long lengths of film must be repaired.

By way of illustration, in an article published by the Society of Motion Picture and Television Engineers, Inc., entitled "Interpretation of Dimensional Changes in Cellulose Ester Base Motion-Picture Films" by P. Z. Adelstein and J. M. Calhoun, Journal of the SMPTE, Volume 69, March 1960, at pages 157–163, it was reported that triacetate positive motion picture film manufactured by the Eastman Kodak Co., would shrink in the lengthwise direction on the average of 0.40% after 6 years while negative triacetate film would shrink on the average of 0.18% after 6 years. After only 2 years, the report indicated a lengthwise shrinkage of about 0.27% on the average for positive film and 0.17% for negative film.

Thus, if for example, a two year old triacetate positive 16 mm film were to be repaired, the lengthwise shrinkage from the ANSI new film standard would be about 0.0027 inches per inch of film. If 10 inches of film needed repair, and the repair tape of be applied conformed with the ANSI new film standards, the last pre-perforated hole in the tape would be disaligned with the corresponding original sprocket feed hole location of the film by 0.027 inches or about 53% unless some means are provided to precisely match each hole in the tape with each corresponding hole location in the film.

It has been found, that in the case of 16 mm film, if the sprocket feed holes 36 of the repair tape 34 are disaligned with the corresponding original sprocket feed holes 24 of the 16 mm film 22 in the lengthwise direction of the film by more than twenty five percent or 0.0125 inches (0.032 cm), smooth and satisfactory feed and projection of the repaired film through a projector will not be achieved. Similarly, if the sprocket feed hole perforations 36 in the repair tape 34 are disaligned with the original sprocket feed holes 24 of the film 22 in the lateral direction of the film by more than 25 percent of 0.018 inches (0.046 cm), the repaired film will not feed smoothly through a projector and will likely misregister in the projection gate during projection.

For 35 mm film, which is somewhat more tolerant than 16 mm film, it has been found that a lengthwise disalignment of the sprocket feed hole perforations 36 in the tape 34 with the sprocket feed hole locations 24 in the film 22 of more than about 45% will likely cause misregistration upon subsequent projection. A similar result will occur if the disalignment in the lateral direction of the film 22 exceeds about 20%.

In the present invention, the sprocket roller 58 of the repair apparatus 30 cooperates with the pressure roller 56 to maintain alignment of the sprocket feed holes 36 in the tape 34 with the original sprocket feed hole locations 24 of the film 22 so the disalignment, if any, during laminating of the tape to the film is maintained well within the acceptable tolerance limits, and hence substantially coincident, throughout any length of film footage repaired. This alignment is maintained notwithstanding that the distance between sprocket feed holes 36 in the tape 34 may be significantly greater than the spacing between the sprocket feed holes 24 of the film 22 being repaired.

Referring primarily to FIGS. 4, and 7 through 9, the sprocket roller 58 comprises a smooth surfaced cylindrical metal sleeve 106 secured to the shaft 108 journaled in the frame 44 with the sprocket teeth 60 projecting from the periphery of the sleeve adjacent the end of the sleeve remote from the frame, and receives the tape 34 from its roll 32 with the adhesive surface facing outwardly. Herein, a cylindrical knob 110 for manually turning the sprocket roller 58 is secured to and projects outwardly from the end of the sprocket roller, the knob having a grooved surface 112, to facilitate gripping.

The sprocket teeth 60 each have generally truncated pyramidal shapes with rectangular cross-sections corresponding generally to the shape of the sprocket feed hole perforations in the tape 34 and film 22, and are spaced apart a distance substantially corresponding to the longitudinal spacing of the sprocket feed hole perforations 36 of the tape. Mating with each sprocket tooth 60 is a corresponding aperture 114, herein circular in cross-section, formed in the surface of the sleeve 74 of the pressure roller 56.

Figure 9:
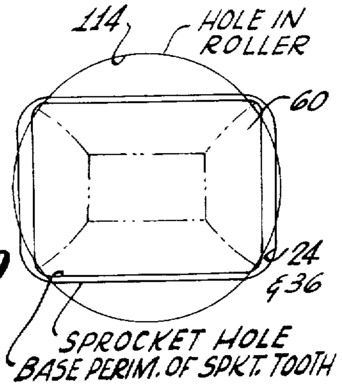
FIG. 9 is an enlarged schematic top plan view looking in the direction of the arrow 9 of FIG. 7.

With reference primarily to FIG. 9, it can be seen that the base perimeter of each sprocket tooth 60 is formed to substantially fill the space defined by the perforations 36 and 24 of the tape 34 and film 22, respectively, when inserted there through during the laminating process, and that the diameter of each aperture 114 in the sleeve 74 is dimensioned to substantially correspond with the base diagonal length of the sprocket tooth. In order to insure precise alignment of the perforations 36 of the tape 34 with the perforations 24 of the film 22, it is important that the size of each sprocket tooth 60 have a base perimeter within the acceptable tolerances of the misregistration between the tape and film, and preferably less.

Again, by way of example, it has been found that for repair of 16 mm film, sprocket teeth having a base perimeter of 0.047 inches (0.119 cm) by 0.064 inches (0.162 cm) will produce extremely accurate alignment of the perforations 36 of the tape 34 with the perforations 24 of the film 22 when coupled with an aperture 114 having a diameter of 0.073 inches (0.185 cm) in the pressure roller 56. For repair of 35 mm film, a sprocket tooth base perimeter of 0.073 inches (0.185 cm) by 0.104 inches (0.264 cm) when coupled with an aperture having a diameter of 0.110 inches (0.279 cm) will accurately laminate tape and film well within acceptable tolerances.

Figure 6:
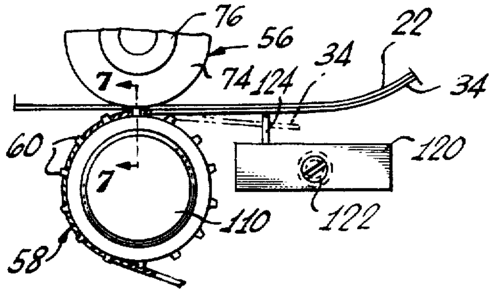
FIG. 6 is an enlarged fragmentary front elevational view of a portion of the apparatus of FIG. 4.

Referring now primarily to FIGS. 4 and 6, prior to a repair operation, the pressure roller 56 is raised and an initial portion of the tape 34 is positioned around the sprocket roller 58 with the teeth 60 of the sprocket roller extending through the sprocket feed holes 36 of the tape. To hold the tape 34 in position on the sprocket roller 58, the free end of the tape is releasably held by a stationary catch 118, which herein comprises a generally rectangular bar 120 secured by a bolt 122 to the frame 44 and having a single upstanding pin 124 over which one of the sprocket feed holes 36 adjacent the free end of the tape is disposed.

An initial portion of the film 22 having the damaged sprocket feed holes 24 is withdrawn from the supply reel 26 and inserted between rollers 48 and 52 of the preliminary station 48, is trained around the guide spools 70 and 71, and then is positioned over the sprocket roller 58 around which the tape 34 has been positioned. The pressure roller 56 is then positioned and lowered so that one of its apertures 114 receives the upstanding sprocket tooth 60 which projects through both the tape 34 and the film 22 as shown in FIG. 6. Preferably, the initial alignment of the film 22 and tape 34 is done by positioning an undamaged feed hole 24 of the film over the sprocket tooth 60 so that accurate initial alignment is achieved.

Upon lowering the pressure roller 56, the spring 92 acts to apply pressure to the nip between the pressure roller and the sprocket roller 58 to press the initial portion of the film 22 firmly against the adhesive surface of the initial portion of the tape 34 thereby laminating and adhesively bonding the film and tape together. Since the base perimeter of the sprocket tooth 60 is dimensioned to accurately align the sprocket feed hole perforation 24 of the film 22 with that of the tape 34, initial alignment in both the lengthwise and lateral width directions is automatically achieved when the pressure roller 56 is lowered to force the film firmly against the tape and surface of the sprocket roller 106.

After initial alignment of the first sprocket feed hole 24 of the film 22 to be repaired with the initial sprocket feed hole 36 of the tape 34, the free end of the tape is removed from the pin 124 of the catch 118 and the film and tape are continuously and sequentially fed simultaneously through the primary repair station 54 until the entire length of film requiring repair has been laminated with tape. When repair of the entire length of film has been completed, the tape 34 is cut and removed from the sprocket roller 58 to terminate the laminating process in the primary repair station 54.

During lamination in the primary repair station 54, the sprocket roller 58 herein is rotated by the knob 110 to automatically drive both the tape 34 and the film 22 through the station. While the precise actual reason is not completely understood, as the tape 34 and film 22 simultaneously pass through the nip of the pressure and sprocket rollers 56 and 58, the difference in length between the film and tape is automatically compensated for so that precise alignment of each sprocket feed hole 36 in the tape with the corresponding sprocket feed hole 24 in the film is sequentially achieved, even though the lengthwise hole spacing is greater in the tape than in the film.

It has been theorized that as the film 22 is moved through the primary repair station 54, some slippage between the tape 34 and film 22 takes place so that the film feeds at a slightly lower rate than the tape. Because the leading side of each sprocket tooth 60 in the direction of travel forms a stop surface against which the leading edge of the sprocket feed holes 24 and 36 can abut, and due to the more rigid nature of the relatively thick film 22 relative to the more thin and flexible tape 34 excess tape in the lengthwise direction will periodically bunch up and form a small crease or gather (see FIG. 8) just ahead of or adjacent a sprocket feed hole to compensate for the length difference between the feed hole spacings of the tape and film.

In any event, it has been found that gathers or small creases frequently occur in the area of the sprocket feed hole perforations 36 of the tape 34 in repaired film, and that the alignment of the sprocket feed holes in the tape with those of the repaired film 22 always correspond to within the acceptable tolerance limits, even when many feet of film with a relatively large number of damaged sprocket feed holes have been repaired. Since the tape 34 is laterally precut so that only the portion carrying sprocket feed holes 36 remains and does not extend a significant distance over the adjacent picture frames on the film 22, the presence of creases or gathers in the tape will not inhibit the quality of the picture projected from the repaired film.

From the primary repair station 54, the repaired film 22 is guided around a flanged spool 126 journaled on a shaft 128 secured to the frame 44, to the terminal station 62 (see FIG. 1) where heat and pressure are again applied to more firmly bond the film and tape 34 and further smooth out creases and gathers in the tape. In this instance, the terminal station 62 comprises an upper roller 64 and a lower heated roller 66 like that of the preliminary station 48, the rollers each being supported on spindles 130 and 132 journaled in the frame 44. From the third terminal station 62, the film 22 is directed from the repair apparatus 30 to the take up reel 38 where it is collected.

It is important to the operation of the present apparatus 20 that little or no tension be applied to the film 22 during its travel through the primary repair station 54 as it has been found that proper alignment of the film and tape 34 may not result. For this reason, a second chain 134 interconnects the upper roller 64 of the terminal station 62 with the take-up reel 38 to drive the rollers 64 and 66 of the terminal station in synchronism with the take-up reel. With this arrangement, independent control of the rate of take-up of repaired film, the rate of supply of film to be repaired, and the rate of repair can be obtained to insure that undue tension is not applied to the film 22 during its movement through the repair apparatus 30.

Figure 3:
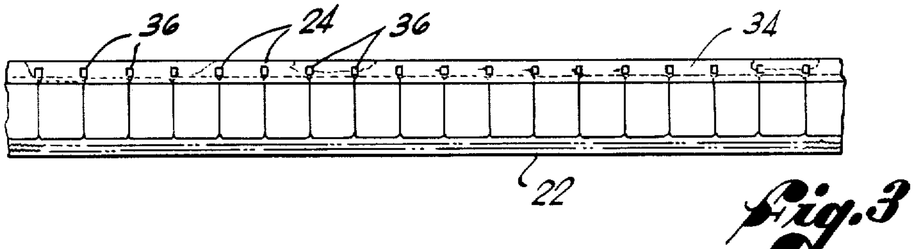
FIG. 3 is a plan view similar to FIG. 2 and illustrating the damaged film strip after repair.

When the repair operation has been completed, the repaired film 22 can be removed from the repair apparatus 30 and either be fully wound on to the take-up reel 38 or rewound directly back onto the supply reel 26. As depicted in FIG. 3, the repaired film 22 will have a strip of transparent repair tape 34 extending along the side edge of the film throughout the length of the damaged film portion, and the sprocket feed holes 36 in the tape will form replacement feed holes for the damaged or torn out sections of the film strip originally carrying sprocket feed holes 24.

Frequently, it may be necessary to repair several sections of the film strip 22 which are separated by many feet of film. In such a case, it is merely necessary to temporarily remove the film from the primary repair station 54 after completion of repair of the first damaged section, and then rapidly move the film between the supply and take-up reels 26 and 38, respectively, until the next film section to be repaired is located, where upon the film can be repositioned in the primary repair station and a new repair operation commenced.

In some instances, when substantial lengths of the side edge of the film 22 have been torn out, it may be necessary to apply a second strip of repair tape 34 to the reverse face of the film so that a double thickness of repair film is obtained. In such a situation, it will be necessary to turn the film 22 upside down and rerun the damaged portions through the repair apparatus 30 a second time. With the present apparatus, a second strip of repair tape 34 can be applied to the second face of the film simply by reversing the orientation of the pressure and sprocket rollers 56 and 58 on their respective support shafts 76 and 108 so that the respective apertures 114 and sprocket teeth 60 are located near the roller end adjacent the front face of the frame 44.

In the case of repairing film having two parallel rows of sprocket feed holes along each side edge portion, it is preferable that the sprocket rollers 58 and the pressure roller 56 be modified to include, respectively, two sets of teeth 60 and cooperating apertures 114, one set adjacent one end of the roller and the second set spaced longitudinally along the axis of the roller a distance to match within the acceptable tolerances the lateral width spacing between the parallel rows of sprocket feed holes on the film. With such an arrangement, two strips of repair tape 34 could be applied simultaneously to the damaged film, one to each damaged side edge portion.

Alternatively, the apparatus as illustrated in the drawings could be used to apply tape to both side edges of a film strip simply by running the strip once through the repair apparatus and then turning the strip upside down and again running it through the apparatus without changing the orientations of the sprocket roller 58 or pressure roller 56. In this event, the tape would be laminated first on one face of the film and then on the opposite face along the opposite side edge portion.

From the foregoing, it should be apparent that the present invention permits rapid and reliable repair of elongated flexible strips having sprocket feed hole perforations which have been damaged during handling or use. Moreover, the present invention, is capable of permitting substantial lengths of such strips having a large number of damaged sprocket feed hole perforations to be quickly and accurately repaired, by replacing the damaged feed holes with pre-perforated new repair tape, notwithstanding that substantial shrinkage in the strip may have taken place.

While the repair apparatus 30 of the invention has been described and illustrated as including a preliminary station 48 and a terminal station 62, it should be noted that one or both of these stations may not be necessary in all repair operations. For example, if the film section to be repaired does not need to be flattened or straightened preparatory to lamination of the repair tape, the film strip may not need to pass through the pressure rollers 50 and 52 of the preliminary station 48 and, similarly, if further bonding and flattening of the tape and film are not required after repair in the primary repair station, the terminal station 62 may be by-passed and the repaired film wound directly onto the take-up reel 38.

While a particular form of the invention has been illustrated and described, it also will be apparent that various modifications and variations can be made without departing from the spirit and scope of the invention.

We claim:

1. An apparatus capable of repairing substantial continuous lengths of elongated flexible strips having a relatively large number of damaged sprocket feed hole preparations along one side edge portion thereof by laminating thereto an elongated flexible repair tape carrying preformed replacement feedhole performations therein, said apparatus comprising:

means sequentially aligning each preformed sprocket feed hole carried by said tape with each successive sprocket feed hole location along the side edge portion of said flexible strip in a manner such that each of said preformed holes in said tape substantially coincides with the corresponding feed hole location on said flexible strips;

and means for sequentially bonding said tape to said side edge portion of said flexible strip while maintaining said aligned condition, whereby said tape is laminated to said flexible strip with each of said preformed replacement holes substantially coinciding with each of said damaged feed hole locations on said flexible strip.

2. An apparatus as defined in claim 1 in which said aligning means comprise a plurality of upstanding teeth each having a cross-sectional shape similar to that of said feed hole perforations, and a base perimeter dimensioned to correspond within a critical tolerance range to the size of said preformed sprocket feed hole.

3. An apparatus as defined in claim 1 in which said aligning and bonding means comprise a sprocket roller having a plurality of upstanding peripheral teeth dimensioned to align said preformed sprocket feed holes of said tape with said sprocket feed hole locations of said strip, and a pressure roller cooperating with said sprocket roller to apply pressure thereon and having a plurality of apertures dimensioned to receive said peripheral teeth;

and means for simultaneously rotating said pressure and sprocket rollers to sequentially and simultaneously feed said tape and said strip into the nip of said rollers, whereby said teeth align and hold said sprocket feed holes in said aligned condition while said pressure roller cooperates therewith to apply pressure to laminate said tape and strip.

4. An apparatus as defined in claim 3 including means for supporting a supply of repair tape and for guiding and feeding said tape onto said sprocket roller;

and means for aligning and guiding said strip into the nip of said pressure and sprocket rollers.

5. An apparatus as defined in claim 3 including means for straightening and flattening said strip preparatory to entering the nip of said pressure and sprocket rollers.

6. An apparatus as defined in claim 5 in which said straightening and flattening means comprise a first heated roller and a second roller cooperating with said first heated roller to apply pressure therebetween.

7. An apparatus as defined in claim 3 including means for more firmly bonding said tape to said strip subsequent to said lamination of said tape and strip by said cooperating pressure and sprocket rollers.

8. An apparatus as defined in claim 7 in which said means for more firmly bonding said tape and said strip comprise a first heated roller and a second roller cooperating with said heated roller to apply pressure therebetween whereby heat and pressure can be applied to said laminated tape and strip.

9. An apparatus for applying an elongated strip of flexible repair tape having preformed replacement feed hole perforations therein to the side edge portion of a motion picture film strip of substantial continuous length having damaged sprocket feed hole perforations located therealong, said apparatus comprising:

means for aligning each of said preformed feed hole perforations of said tape with each of said damaged sprocket feed hole perforation locations along said side edge portion of said film in such a manner that each of said preformed perforations of said tape substantially coincides with the corresponding perforation location of said damaged feed hole perforation of said film;

and means for bonding said tape to said side edge portion of said film in said aligned condition whereby said tape is laminated to said film with said feed hole perforations of said tape replacing the damaged feed hole perforation location along said film.

10. An apparatus as defined in claim 9 in which said means for aligning comprise a plurality of upstanding sprocket teeth each having a cross-sectional shape similar to that of the shape of said sprocket feed hole perforations and a base perimeter dimensioned to correspond within a critical tolerance range to the size of said preformed replacement feed hole.

11. An apparatus as defined in claim 10 in which said film is 16 mm film, and said base perimeter of each of said sprocket teeth is dimensioned to correspond with the size of said preformed feed hole to produce an alignment of said film and tape to within a tolerance of about 25 percent.

12. An apparatus as defined in claim 10 in which said film is 35 mm film and said base perimeter of each of said sprocket teeth is dimensioned to correspond with the size of said preformed feed hole in the lengthwise direction of said tape to produce an alignment of said film and tape to within a tolerance of about 45 percent, and in the lateral width direction, to within a tolerance of about 20 percent.

13. An apparatus as defined in claim 9 in which said aligning and bonding means comprise a sprocket roller having a plurality of upstanding peripheral teeth dimensioned to align said preformed sprocket feed holes of said tape with said sprocket feed hole locations of said film, and a pressure roller cooperating with said sprocket roller to apply pressure thereon and having a plurality of apertures dimensioned to receive said peripheral teeth;

and means for simultaneously rotating said pressure and sprocket rollers to sequentially and simultaneously feed said tape and said film into the nip of said rollers, whereby said teeth align and hold said sprocket feed holes in said aligned condition while said pressure roller cooperates therewith to apply pressure to laminate said tape and film.

14. An apparatus as defined in claim 13 including at least one guide spool for guiding said film into the nip of said pressure and sprocket rollers in such a manner that the longitudinal centerline of said film is perpendicular to the axes of said rollers.

15. An apparatus as defined in claim 13 in which each of said sprocket teeth has a cross-sectional shape similar to that of said feed hole perforation and a base perimeter dimensioned to correspond within a critical tolerance range to the size of said preformed replacement feed hole perforation.

16. An apparatus as defined in claim 15 including means for straightening and flattening said film preparatory to entering the nip of said pressure and sprocket rollers.

17. An apparatus as defined in claim 15 including means for more firmly bonding and laminating said tape to said film subsequent to removal of said repaired film from said pressure and sprocket rollers, said means for more firmly bonding and laminating comprising a heated roller and a pressure roller cooperating with said heated roller to apply pressure thereto whereby heat and pressure can be applied to said laminated film and tape.

18. A method for repairing a substantial length of a motion picture film strip having a large number of damaged sprocket feed hole perforations located along the side edge portion of the film by applying to the damaged side edge portion an elongated flexible repair tape carrying preformed replacement feed hole perforations therein, said method comprising the steps of:

aligning an initial portion of said elongated tape with an initial side edge portion of said film strip to be repaired;

aligning one feed hole perforation in said initial portion of said tape with one feed hole perforation in said initial side edge portion of said film so that said perforations substantially coincide;

bonding said initial portions together in said aligned condition;

and sequentially aligning and bonding continuously the remaining feed hole perforations of said tape with the remaining feed hole perforation locations along said side edge portion of said film strip in a manner such that each feed hole perforation in said tape strip substantially coincides with the corresponding feed hole perforation location of said film strip.

19. The method as defined in claim 18 further including the step of flattening and straightening said film preparatory to said steps of aligning and bonding.

20. The method as defined in claim 18 wherein said repair tape has a pressure sensitive adhesive on one face and in which said steps of aligning and bonding said feed hole perforation locations along said film strip comprise the steps of sequentially and continuously positioning each of said perforations of said tape over a sprocket tooth dimensioned to receive said perforation therearound, and simultaneously position said film adjacent the adhesive face of said tape so that each corresponding sprocket feed hole location of said film is disposed around said tooth and substantially coinciding with said perforation of said tape, and applying pressure to said film and tape in the area adjacent said tooth whereby said adhesive bonds said film and tape together.

21. An apparatus for applying an elongated strip of flexible repair tape having preformed replacement feed hole perforations therein to the side edge portion of a motion picture film strip of substantial length having damaged sprocket feed hole perforations located therealong, said apparatus comprising:

a frame;

a preliminary station mounted on said frame and including a first heated roller and a first pressure roller engaged with said heated roller and adapted to receive film from a supply reel and to apply heat and pressure thereto;

a primary repair station mounted on said frame and adapted to receive film from said preliminary station, said repair station comprising a rotatable sprocket roller having a plurality of upstanding peripheral teeth disposed adjacent one end, each of said teeth having a cross-sectional shape similar to that of a sprocket feed hole perforation of said film and dimensioned to substantially fill the space defined by a replacement sprocket feed hole of said tape, and a rotatable second pressure roller normally engaging said sprocket roller, said second pressure roller having a plurality of peripheral apertures adapted to receive said teeth of said sprocket roller;

means biasing said second pressure roller toward functional engagement with said sprocket roller;

means for rotatably supporting a supply roll of repair tape on said frame;

means coupled with said sprocket roller for rotating said sprocket roller;

means for guiding and aligning film from said preliminary station onto said sprocket roller so that the longitudinal centerline of said film is perpendicular to the axis of said sprocket roller and said sprocket feed holes along said side edge portion of said film are aligned with said peripheral teeth of said sprocket roller;

and a terminal station mounted on said frame and including a second heated roller and a third pressure roller engaged with said second heated roller and adapted to receive repaired film from said primary repair station.

22. An apparatus as defined in claim 21 further including means for selectively disengaging said second pressure roller from said sprocket roller and means for releasably securing the free end of a portion of said repair tape in position around said sprocket roller.

23. An apparatus as defined in claim 22 in which said disengaging means comprise a lever assembly mounted on said frame and supporting said second pressure roller, and said bias means comprise a spring acting between said frame and said lever assembly to urge said second pressure roller into frictional engagement with the periphery of said sprocket roller.

24. An apparatus as defined in claim 23 in which said guiding and aligning means comprise a rotatable spool supported on said frame and having enlarged side flanges spaced apart a distance substantially corresponding to the lateral width of said film.

25. An apparatus as defined in claim 24 in which said releasable securing means comprise an upstanding pin secured to said frame and adapted to project through one of said replacement sprocket feed holes of said tape.

* * * * *